United States Patent
Georges

(10) Patent No.: US 7,071,402 B2
(45) Date of Patent: Jul. 4, 2006

(54) AUTOMATIC SOUNDTRACK GENERATOR IN AN IMAGE RECORD/PLAYBACK DEVICE

(75) Inventor: Alain Georges, Saint Paul (FR)

(73) Assignee: Medialab Solutions LLC, Chicago, IL (US)

( * ) Notice: Subject to any disclaimer, the term of this patent is extended or adjusted under 35 U.S.C. 154(b) by 291 days.

(21) Appl. No.: 10/640,854

(22) Filed: Aug. 13, 2003

(65) Prior Publication Data

US 2004/0031379 A1    Feb. 19, 2004

Related U.S. Application Data

(63) Continuation of application No. 10/153,115, filed on May 21, 2002, now Pat. No. 6,608,249, which is a continuation of application No. 09/691,302, filed on Oct. 17, 2000, now Pat. No. 6,392,133.

(51) Int. Cl.
*A63H 5/00* (2006.01)
*G04B 13/00* (2006.01)
*G10H 7/00* (2006.01)

(52) U.S. Cl. ............... 84/609; 84/645; 345/978; 352/1; 386/66

(58) Field of Classification Search ............ 84/609, 84/634, 645; 345/302, 978; 352/1; 386/66, 386/99
See application file for complete search history.

(56) References Cited

U.S. PATENT DOCUMENTS

| | | | |
|---|---|---|---|
| 4,399,731 A | 8/1983 | Aoki | 84/1.03 |
| 5,177,618 A | 1/1993 | Dunlap et al. | 358/335 |
| 5,300,723 A | 4/1994 | Ito | 84/601 |
| 5,386,081 A | 1/1995 | Nakada et al. | 84/609 |
| 5,496,962 A | 3/1996 | Meier et al. | 84/601 |
| 5,523,525 A | 6/1996 | Murakami et al. | 84/602 |
| 5,581,530 A | 12/1996 | Iizuka et al. | 369/93 |
| 5,590,282 A | 12/1996 | Clynes | 395/200.02 |
| 5,627,335 A | 5/1997 | Rigopulos et al. | 84/635 |
| 5,648,628 A | 7/1997 | Ng et al. | 84/610 |
| 5,689,081 A | 11/1997 | Tsurumi | 84/609 |
| 5,753,843 A | 5/1998 | Fay | 84/609 |
| 5,763,804 A | 6/1998 | Rigopulos et al. | 84/635 |
| 5,792,971 A | 8/1998 | Timis et al. | 84/609 |
| 5,877,445 A | 3/1999 | Hufford et al. | 84/602 |
| 6,011,212 A | 1/2000 | Rigopulos et al. | 84/667 |
| 6,074,215 A | 6/2000 | Tsurumi | 434/307 |
| 6,083,009 A | 7/2000 | Kim et al. | 434/307 |
| 6,182,126 B1 | 1/2001 | Nathan et al. | 709/219 |

FOREIGN PATENT DOCUMENTS

| | | |
|---|---|---|
| EP | 484047 | 10/1991 |
| EP | 0702366 | 9/1995 |
| EP | 0747877 | 6/1996 |

(Continued)

*Primary Examiner*—Jeffrey W Donels
(74) *Attorney, Agent, or Firm*—Loudermilk & Associates

(57) ABSTRACT

An Automatic Soundtrack Generator permits merger of a sound track that is independent of the external sound source, while either recording or playing a video sequence. The Automatic Soundtrack Generator integrates in a video recorder or player a module that generates music or other sounds which either can be mixed with the originally recorded sound (sound mixing), or can replace the originally recorded sound (sound dubbing). This sound mixing or dubbing can be performed either at video/audio record time or at play back time.

20 Claims, 2 Drawing Sheets

FOREIGN PATENT DOCUMENTS

| | | |
|---|---|---|
| EP | 0857343 | 10/1996 |
| GB | 2306043 | 4/1997 |
| WO | WO 88/05200 | 7/1988 |
| WO | WO 89/02641 | 3/1989 |
| WO | WO 97/15043 | 4/1997 |
| WO | WO 97/35299 | 9/1997 |
| WO | WO 98/33169 | 7/1998 |
| WO | WO 01/63592 | 8/2001 |

AUTOMATIC SOUNDTRACK GENERATOR IN AN IMAGE RECORD/PLAYBACK DEVICE

This is a continuation of U.S. patent application Ser. No. 10/153,115, filed May 21, 2002, now U.S. Pat. No. 6,608,249, which is a continuation of U.S. patent application Ser. No. 09/691,302, filed Oct. 17, 2000, now U.S. Pat. No. 6,392,133.

This application is a continuation of U.S. patent application Ser. No. 09/691,302, filed Oct. 17, 2000, which claims foreign priority based on French Application 99 14420, filed Nov. 17, 1999.

BACKGROUND OF THE INVENTION (a) Field of the Invention

The current invention relates to an automatic soundtrack generation device that operates to merge a sound track that is independent of an external sound source, while recording or playing back a video sequence.

(b) Description of Related Art

Various devices capable of recording or playing video recordings have already been developed, such as digital or analog camcorders and other video recorders. These devices can possess one or several audio inputs which permit mixing or replacement of the sound track that was recorded originally during the recording of the image with an external audio source.

Furthermore, there also exist various devices that are capable of playing recorded pieces, such as digital compact disc players, players of compressed files (for instance as per the MPEG-level 3 standard), etc.

Finally, there exist devices that are based on synthesizers of instrumental sounds on which are applied, for instance as per the MIDI (Musical Instrument Digital Interface) standard, "scores" of notes that are composed automatically.

SUMMARY OF THE INVENTION

The present invention represents an improvement of prior art devices by integrating in a video recorder or player a module that generates music or other sounds which either can be mixed with the originally recorded sound (sound mixing), or can replace the originally recorded sound (sound dubbing). This sound mixing or dubbing can be performed either at video/audio record time or at play time (FIG. 1).

The invention disclosed herein envisions selection of musical pieces either out of a library stored, for instance, in the form of digitized musical files (e.g., MP3 or CD music files, etc.), of MIDI files or other types of files; or from pieces that are composed in a pseudo-random fashion using, for instance, the synthesizer function to play original musical pieces.

The invention further envisions selection of musical pieces according to a specified musical style, in a pseudo-random fashion, or according to predefined criteria, wherein the audio files meet the predefined criteria and are either extracted from a music library or are generated by an automatic composition function. The resulting sounds are used either during the video recording or during the video playback.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE PREFERRED EMBODIMENTS

The present invention will be described in greater detail with reference to certain preferred and alternative embodiments. As described below, refinements and substitutions of the various embodiments are possible based on the principles and teachings herein.

Figure 1:
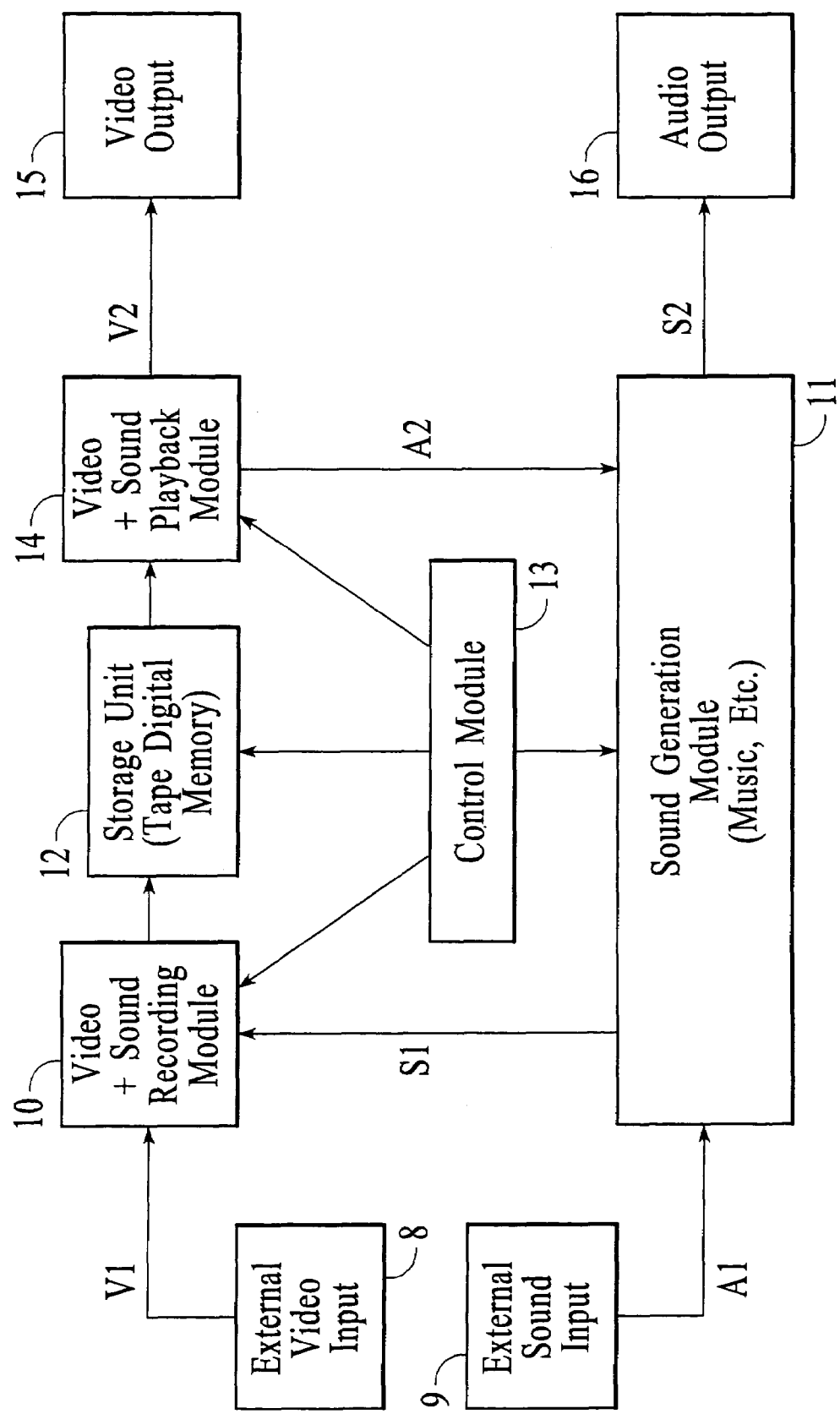
FIG. 1 is a block diagram of a system incorporating the present invention.

FIG. 1 represents a system in block diagram form showing an external video input 8 providing a signal V1 to a video and sound recording module 10 connected to store the signal V1 on a storage medium 12 such as a tape or a digital memory. The storage medium is connected to a video and sound playback module 14 that produces an output V2 connected to a video output module 15 and an audio output A2 connected to a sound generation module 11. Items 10, 12, 14 and 15 are generally contained in a commonly known camcorder device. The camcorder device also includes an external sound input element 9, such as a microphone, producing an audio output A1. Output A1 is also connected to sound generation module 11. A control module 13, shown connected to items 10, 12, 14 and 11 in FIG. 1, selects sounds generated by sound generation module 11 to produce output S2 providing audio output 16.

Figure 2:
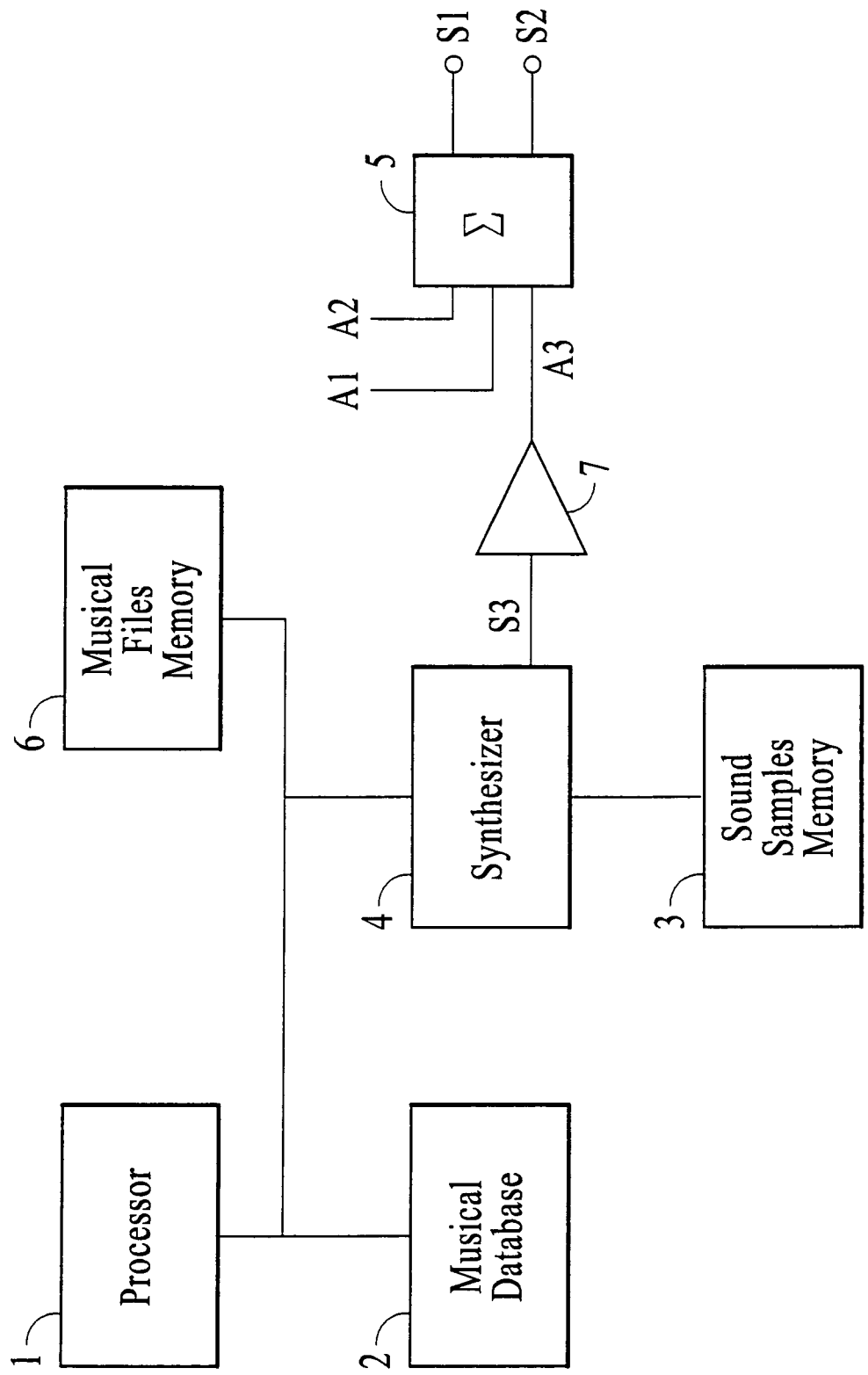
FIG. 2 is a block diagram of one embodiment of the present invention.

According to the functional diagram of FIG. 2, one embodiment of the invention can typically be represented by a module that generates music or other sounds and which comprises essentially a processor 1, a memory 2 containing the music database of the automatic composition device, a musical synthesizer 4, a memory 3 storing the sound samples for the musical synthesizer, a digital to analog conversion circuit 7, a summation circuit 5 and a memory 6, internal or external to the invention, containing a library of digitized musical files (other alternatives/embodiments of such autocomposition systems may be understood from co-pending U.S. application Ser. No. 09/691,314 filed on even date herewith for "Interactive Digital Music Recorder and Player," which is hereby incorporated by reference. The memory elements 2, 3 and 6 can be made of one or several distinct physical components. Processor 1 is able to select, according to certain criteria that are pre-defined or defined by a user, musical files out of the library in memory 6, or is able to compose automatically a melody out of the database stored in memory 2, with an automatic composition algorithm. The output signal S3 of the synthesizer, after digital to analog conversion in converter 7, delivers an analog signal A3 which can optionally be mixed with the recorded audio A2 or with the external audio input A1 in summation circuit 5 to deliver the mixed complete audio signal S1/S2. This mixed audio signal S1/S2, which forms the output of the invention, can then be used as a sound source at video/audio record time (real time) (S1) or at play back time (time shifted) (S2). As a result prerecording of movie soundtracks, for example, is unnecessary. A simple way is provided for a user to change sound content, pitch, etc. for implementation in a video soundtrack.

In a preferred embodiment of the invention, the processor 1 is made of a microprocessor or microcontroller linked to one or several memories. A RAM memory (volatile memory) can serve as the working memory of the microprocessor, whereas a ROM or EPROM memory can store the microprocessor program and the music database 2 of the automatic composition device. However, a greater flexibility will be granted by non-volatile memories: RAM memory saved by a disposable or rechargeable battery, or Flash EEPROM memory (electrically erasable). The non-volatile memory can be used to store the music database 2 of the automatic composition device and the digitized musical files of the library in sound samples memory 3, as well as the microprocessor program. This permits easy update for the music database and the microprocessor program.

The synthesizer 4 and the microprocessor 1 of FIG. 2 cooperate to select banks of sound samples according to predetermined processor instructions to provide the synthesizer output S3. The sound sample banks contain sounds in digital form of predetermined instruments.

The processor 1 can also be used to select the sound source or sources described above. Furthermore, the processor can be used to select commands which permit activation functions such as playing a recording, selecting and mixing an audio source, or controlling any other functions that are commonly found in video recorder based equipment. This combines the functions of blocks 11 and 13 of FIG. 1.

Also, it will be understood that the system herein desirably will operate responsive to one or more switch inputs or the like, or to commands entered via a graphical interface such as may be presented, under control of a processor, on an LCD or other display, which may be integral with and/or external to the device. In such a manner, the user may more desirably control the musical output to be recorded or played back, which may include the selection of styles or types of music (e.g., dance, techno, hip-hop, rap or cool, with substyles such as ballad, new age, Latin, etc.), having selections played in accordance with an order specified by user, or by random or pseudo-random selection under control of the processor, etc., as may be desired to generate the desired soundtrack. The present invention also may be used with a virtual radio type of system to provide substitute or additional audio/musical inputs such as for soundtrack generation; reference is made to co-pending U.S. application Ser. No. 09/690,911 filed on even date herewith for "Virtual Radio," which is hereby incorporated by reference.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A soundtrack generator having at least a music auto-composition function for an image record or playback device, comprising:
    an image record/playback device for recording or displaying one or more images;
    an external audio source input;
    a command input for receiving instructions; and
    a sound generation module, wherein the sound generation module comprises a processor, one or more memory elements and a digital music synthesizer, wherein the one or more memory elements store sound samples, wherein the processor operates responsive to instructions received via the command input, wherein the digital music synthesizer is controlled to automatically compose music based on the stored sound samples;
    wherein, in response to received instructions, a soundtrack is selectively provided during image display by the image record/playback device, wherein the soundtrack selectively consists at least in part of automatically composed music generated by the digital music synthesizer or sound signals received via the external audio source input.

2. The soundtrack generator of claim 1, further comprising a digital to analog conversion circuit receiving digitized sound from the sound generation module, wherein an output of the digital to analog conversion circuit is coupled to an audio output.

3. The soundtrack generator of claim 2, further comprising a summation circuit, wherein the summation circuit selectively combines sound signals from the external sound input with the output of the digital to analog conversion circuit, wherein an output of the summation circuit is coupled to the audio output.

4. The soundtrack generator of claim 1, wherein the stored sound samples comprise sounds from a plurality of predetermined instruments.

5. The soundtrack generator of claim 4, wherein the stored sound samples comprise one or a plurality of sound sample banks used by the digital music synthesizer.

6. The soundtrack generator of claim 1, wherein the instructions control the sound generation module to automatically compose music in accordance with a selected style of music.

7. The soundtrack generator of claim 1, wherein the instructions control the sound generation module to automatically compose a plurality of musical compositions in a random or pseudo-random sequence.

8. The soundtrack generator of claim 1, wherein first memory elements store the sound samples, second memory elements store a musical database for use with an autocomposition algorithm, and third memory elements store digitized musical files.

9. The soundtrack generator of claim 8, wherein the digitized musical tiles comprise MP3 or CD music files.

10. The soundtrack generator of claim 1, wherein the command input comprises switch inputs or a graphical interface on a display device.

11. A soundtrack generator having at least a music auto-composition function for an image record or playback device, comprising:
    an image record/playback device for recording or displaying one or more images;
    a command input for receiving instructions; and
    a sound generation module, wherein the sound generation module comprises a processor, one or more memory elements and a digital music synthesizer, wherein the one or more memory elements store sound samples, wherein the processor operates responsive to instructions received via the command inputs wherein the digital music synthesizer is controlled to automatically compose music based on the stored sound samples;

wherein, in response to received instructions, a soundtrack is selectively provided during image display by the image record/playback device, wherein the soundtrack selectively consists at least in part of automatically composed music generated by the digital music synthesizer.

12. The soundtrack generator of claim 11, further comprising a digital to analog conversion circuit receiving digitized sound from the sound generation module, wherein an output of the digital to analog conversion circuit is coupled to an audio output.

13. The soundtrack generator of claim 12, further comprising a summation circuit, wherein the summation circuit selectively combines sound signals from an external sound input with the output of the digital to analog conversion circuit, wherein an output of the summation circuit is coupled to the audio output.

14. The soundtrack generator of claim 11, wherein the stored sound samples comprise sounds from a plurality of predetermined instruments.

15. The soundtrack generator of claim 14, wherein the stored sound samples comprise one or a plurality of sound sample banks used by the digital music synthesizer.

16. The soundtrack generator of claim 11, wherein the instructions control the sound generation module to automatically compose music in accordance with a selected style of music.

17. The soundtrack generator of claim 11, wherein the instructions control the sound generation module to automatically compose a plurality of musical compositions in a random or pseudo-random sequence.

18. The soundtrack generator of claim 11, wherein first memory elements store the sound samples, second memory elements store a musical database for use with an autocomposition algorithm, and third memory elements store digitized musical files.

19. The soundtrack generator of claim 18, wherein the digitized musical tiles comprise MP3 or CD music files.

20. The soundtrack generator of claim 11, wherein the command input comprises switch inputs or a graphical interface on a display device.

* * * * *